(12) United States Patent
Chalabi et al.

(10) Patent No.: US 9,370,808 B2
(45) Date of Patent: Jun. 21, 2016

(54) APPARATUS FOR PROCESSING WASTE MATERIAL

(75) Inventors: Rifat Al Chalabi, Nottingham (GB); Ophneil Henry Perry, Nottingham (GB); John Henry Turner, Retford (GB)

(73) Assignee: CHINOOK SCIENCES LTD. (GB)

( * ) Notice: Subject to any disclaimer, the term of this patent is extended or adjusted under 35 U.S.C. 154(b) by 1006 days.

(21) Appl. No.: 13/394,739

(22) PCT Filed: Aug. 27, 2010

(86) PCT No.: PCT/GB2010/001613
§ 371 (c)(1),
(2), (4) Date: Apr. 11, 2012

(87) PCT Pub. No.: WO2011/027098
PCT Pub. Date: Mar. 10, 2011

(65) Prior Publication Data
US 2012/0186502 A1 Jul. 26, 2012

(30) Foreign Application Priority Data
Sep. 7, 2009 (GB) .................................. 0915557.3

(51) Int. Cl.
*F23G 5/12* (2006.01)
*B09B 3/00* (2006.01)
(Continued)

(52) U.S. Cl.
CPC ................. *B09B 3/00* (2013.01); *B09B 3/0083* (2013.01); *C10B 1/10* (2013.01); *C10B 49/04* (2013.01); *C10B 53/00* (2013.01); *F23G 5/027* (2013.01); *F23G 5/20* (2013.01); *F27B 7/16* (2013.01)

(58) Field of Classification Search
CPC ........... B09B 3/00; B09B 3/0083; F23G 5/20; F23G 5/444; C10B 53/00; C10B 1/10; C10B 49/04
USPC ........................................... 432/117; 366/147
See application file for complete search history.

(56) References Cited

U.S. PATENT DOCUMENTS 1,576,678 A   3/1926  Shaw
1,948,742 A * 2/1934  Andreas ....................... 432/106
(Continued)

FOREIGN PATENT DOCUMENTS

DE          456751       3/1928
GB          2053736 A    2/1981
(Continued)

OTHER PUBLICATIONS

Examination Report for Great Britain Patent Application No. GB1014306.3 issued on Oct. 20, 2010.
(Continued)

*Primary Examiner* — Steven B McAllister
*Assistant Examiner* — Ko-Wei Lin
(74) *Attorney, Agent, or Firm* — Stetina Brunda Garred & Brucker

(57) ABSTRACT

A processing container (100) is provided for processing waste material. The processing container has a housing (150) and a processing zone (152) in said housing for containing waste material to be processed. The housing (150) has a portion (154) directed inwardly of said container to form an opening (160) for the charging and discharging of said processing container. The processing container is rotatable about its axis in a first direction to enable charging of said container through said opening and in a second opposite direction to enable discharging of said container through said opening. The processing chamber is used in an apparatus (10) for processing waste material. The apparatus also includes an oven (12) that contains the processing chamber (14); a gas inlet (200) for introducing said hot gasses into the oven; and a gas outlet (202) for extracting gas from said oven. The processing container (100) is mounted for rotation in said oven.

17 Claims, 10 Drawing Sheets

(51) Int. Cl.
*F23G 5/027* (2006.01)
*F23G 5/20* (2006.01)
*F27B 7/16* (2006.01)
*C10B 1/10* (2006.01)
*C10B 49/04* (2006.01)
*C10B 53/00* (2006.01)

(56) References Cited

U.S. PATENT DOCUMENTS

| | | | | |
|---|---|---|---|---|
| 5,338,144 A | * | 8/1994 | Eshleman | 414/152 |
| 5,492,407 A | * | 2/1996 | Gement | 366/228 |
| 5,572,938 A | * | 11/1996 | Leger | 110/346 |
| 5,655,463 A | | 8/1997 | Good | |
| 6,253,689 B1 | * | 7/2001 | Futatsugi | 110/246 |
| 2009/0314700 A1 | * | 12/2009 | Mabuchi | 210/187 |

FOREIGN PATENT DOCUMENTS

| | | |
|---|---|---|
| GB | 2053736 B | 1/1983 |
| JP | 59102982 A | 6/1984 |
| JP | 59102982 U | 7/1984 |
| JP | H8136140 | 5/1996 |
| JP | H9157436 | 6/1997 |
| JP | 9-196339 A | 7/1997 |
| JP | H9241415 | 9/1997 |
| JP | 11061139 A | 3/1999 |
| JP | 2005188874 A | 7/2005 |
| JP | 2006321886 A | 11/2006 |
| JP | 2008128492 | 6/2008 |
| WO | 0198092 A1 | 12/2001 |
| WO | 2006100511 A1 | 9/2006 |
| WO | 2008122896 A2 | 10/2008 |
| WO | 2008122896 A3 | 7/2009 |
| WO | 2010004268 A1 | 1/2010 |

OTHER PUBLICATIONS

International Search Report for PCT/GB2010/001613 issued on Mar. 6, 2012.
English Translation JP Office Action for Application No. 2012-528439, Jul. 22, 2014, 7 Pages.
Espacenet, English Abstract for JP2008128492, Jun. 5, 2008, 2 Pages.
Patent Abstracts of Japan, English Abstract for JPH8136140, May 31, 1996, 1 Page.
Patent Abstracts of Japan, English Abstract for JPH9157436, Jun. 17, 1997, 1 Page.
Patent Abstracts of Japan, English Abstract for JPH9241415, Sep. 16, 1997, 1 Page.
English Translation of the Text of the First Office Action in relation to PCT Application No. 2010800502313 date of issue Nov. 29, 2013; 8 Pages.
European Office Action for EP 10 752 371.4. mailed Aug. 18, 2015.

* cited by examiner

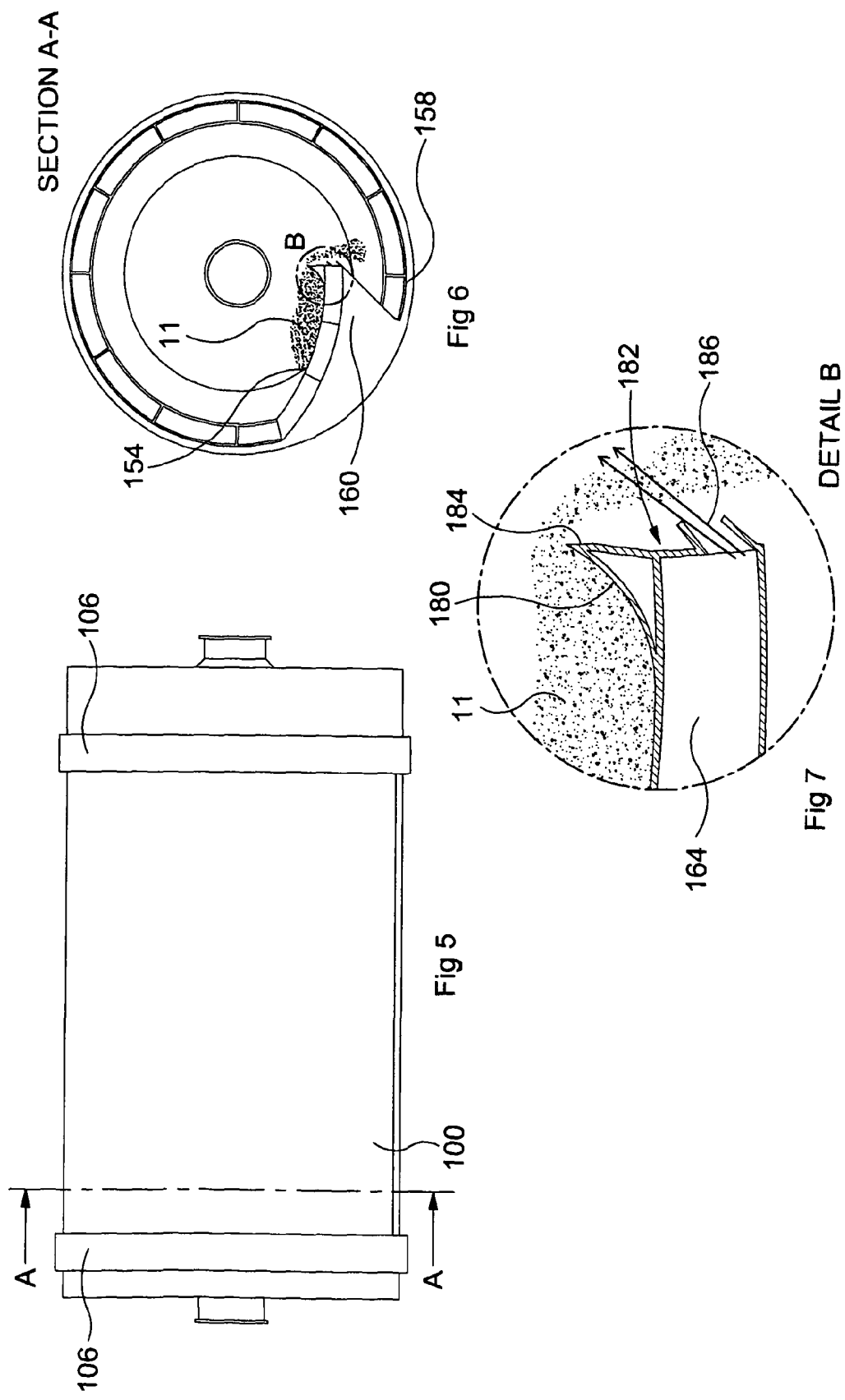

APPARATUS FOR PROCESSING WASTE MATERIAL

CROSS-REFERENCE TO RELATED APPLICATIONS

The present application claims priority to International Application No. PCT/GB2010/001613 filed on Aug. 27, 2010, which claims priority to Great Britain Patent Application No. 0915557.3 filed on Sep. 7, 2009.

FIELD OF THE INVENTION

The present invention relates to an apparatus for processing waste material including organic waste and municipal solid waste (MSW). In particular the invention relates to apparatus and a method for thermally removing coatings and/or impurities from materials which are particularly suited to batch processing of materials.

BACKGROUND OF THE INVENTION

Gasification is a process that converts carbonaceous materials, such as biomass, into carbon monoxide and hydrogen by reacting the raw material at high temperatures with a controlled amount of oxygen. The resulting gas mixture is called synthesis gas or syngas. Synthetic gas is made predominately of CO (carbon Monoxide), and Hydrogen. These two elements are the basic building blocks for the Alcohols (Methanol, Ethanol, Propanol, etc.).

Gasification is an efficient method for extracting energy from many different types of organic materials and provides clean waste disposal. Gasification is more efficient than direct combustion of the original fuel, particularly since more of the organics contained in the processed material is converted into energy (higher thermal efficiency).

Syngas may be burned directly in internal combustion engines or used to produce alcohols such as methanol, ethanol and propanol, and also hydrogen. Gasification of fossil fuels is currently widely used on industrial scales to generate electricity.

There is an increasing requirement to recycle materials such as aluminium, magnesium and other metals and non-metals. Often such materials will be coated in paint, oil, water, lacquers, plastics, or other volatile organic compounds (V.O.C.s) which must be removed prior to re-melting the materials. For materials which are capable of being processed at relatively high temperatures without melting, such impurities are typically removed using a thermal process which is sometimes known as de-coating. Such thermal de-coating processes can also be used to dry and/or sterilize materials prior to remelting.

For example, aluminium is often used in the production of beverage cans which are typically coated in paint, lacquers and/or other V.O.C.s. Before used beverage cans (U.B.C.s) or scrap material produced during the manufacture of beverage cans can be melted down for recycling, any coatings or other impurities must be removed in order to minimize metal loss.

Thermal de-coating, however, is not limited to application to aluminium but can be used to clean or purify any metal or non-metallic materials which are capable of withstanding the temperatures present in the thermal de-coating process. Thermal de-coating can be used to de-coat or purify magnesium or magnesium alloys for example.

Known thermal de-coating processes involve exposing the material to be treated to hot gases in order to oxidise the coatings and/or impurities which are to be removed. This exposure takes place in a closed environment in which the temperature and oxygen content of the hot gases can be controlled. Temperatures in excess of 300° C. are required to remove most organic compounds and an oxygen level in the range of 6% to 12% is normally required.

If the temperature and oxygen levels of the hot gases are not carefully controlled the process can go autothermic as the V.O.C.s which are released during the thermal stripping are combusted. This can result in an uncontrolled increase in the temperature of the hot gases which may be very dangerous.

The material will usually be shredded before treatment and it is important for effective de-coating that all the surfaces of the shredded material are exposed to the hot gases. If this does not occur then the treatment becomes less effective and, in the case of U.B.C.s in particular, a black stain may be left on the surface of the treated material. It is also desirable for the material to be agitated during the treatment to physically remove lose coatings or impurities from the material.

At present there are three main systems which are used for thermal de-coating, these are:

1. Static Oven

In a static oven, the material is stacked on a wire mesh and hot gases are recirculated through the oven to heat the material to the required process temperature.

This arrangement is not efficient because the hot gases do not come in to contact with the materials that are enclosed within the stack of materials on the mesh. As discussed previously, it is important in de-coating that all the surfaces of the materials being treated are exposed to the hot gases. Also there is no agitation of the material being treated.

2. Conveying Oven

This system uses a mesh belt conveyor to transport materials for treatment through an oven. Hot gasses are passed through the material on the belt as it passes through the oven. The problems with this method are as follows:

- The depth of materials on the belt limits the process. The materials are stacked, causing similar problems to those found with the static oven in which materials at the centre of the stack do not come into contact with the hot gases
- There is no agitation of the materials, so loose coatings are not removed.
- The conveyor belt life is short.
- The materials have to be constantly fed.
- The process is not suitable for low volume or continuously changing product.

3. Rotating Kiln

A large kiln is inclined to the horizontal so that material fed or charged into the kiln at its highest end travels towards the lowest end, where it is discharged, under the influence of gravity. The kiln is rotated so that material within the kiln is agitated and a flow of hot gases is provided to heat up the material as it travels through the kiln. A number of problems are associated with this method:

- The material has to be constantly fed.
- The process is not suitable for low volume or continuously changing product.
- The continuous process requires air locks at both ends, i.e. materials charge end and materials discharge end.
- The kiln requires a rotating seal leading to a high level of maintenance.

SUMMARY OF THE INVENTION

The present invention seeks to provide an improved apparatus for processing waste material.

Accordingly, the present invention provides a processing container for processing waste material, the processing container having: a processing zone for containing waste material to be processed; and an outer housing for said processing zone; wherein: said housing has a portion directed inwardly of said container to form an opening for the charging and discharging of said processing container; and said processing container is rotatable about its axis in a first direction to enable charging of said chamber through said opening and in a second, opposite direction to enable discharging of said chamber through said opening.

Optional features of preferred embodiments of the invention are set out in the following paragraphs.

Said inwardly directed portion may extend in a circumferential direction of said chamber beyond said opening.

The container may have door means movable between a first position closing said opening and a second position allowing charging and discharging of said processing container.

Said door means may be biased into said closed position.

Said door means may have resilient members biasing said door means into said closed position.

Said door means may have a closure portion for closing said opening, said closure portion being mounted to said housing by resilient means biasing said door means into said closed position.

The container may have means for directing hot gases into said processing zone.

Said housing may be of substantially circular cross-section.

Said processing container may have a housing of polygonal cross-section.

In one embodiment the housing may have inner and outer walls defining a space therebetween for receiving said hot gases and said inner wall has openings therein for the passage of said hot gases into said processing zone.

The container may have pipe means extending into said processing zone for conducting gas out of said zone, said pipe means having a plurality of through-holes for passage of said gas from said processing zone into said pipe means.

Said through-holes may be arranged for uniform extraction of said gas.

In another embodiment the container may have a pipe extending into said processing zone for conducting hot gases into said zone. The pipe may have an elongate nozzle or outlet slot running along its length through which the hot gasses exit the pipe into the zone. The nozzle may include a nozzle opening in the shape of a slit that extends along the length of the pipe within the processing chamber. The pipe will remain substantially static during operation hut may be rotated so that the direction of the gasses entering the zone can be altered.

The elongate nozzle or outlet may be replaced by a plurality of inlet means attached to the pipe that direct the hot gas from the pipe into the processing chamber.

The inlet means may be substantially wedge or cylindrical wedge shaped so as to part the material in the processing chamber to flow at least partially between adjacent inlet means as the housing rotates.

The inlet means may have side faces that have a plurality of inlet holes therein through which the hot gas passes. As the material passes between the inlet means it is in close proximity to the side faces and is exposed over a large surface area to the hot gasses thereby assisting in rapid heat transfer.

The housing has an outlet therein to enable the hot gasses from the processing zone to exit the apparatus. As neither the outlet nor the inlet tube rotate during use rotating seals are substantially eliminated in this embodiment.

The present invention also provides apparatus for processing waste material comprising: an oven; a processing container as claimed in any of claims 1 to 14; a gas inlet for introducing said hot gasses into the oven; and a gas outlet for extracting gas from said oven; wherein said processing container is mounted for rotation in said oven.

Optional features of preferred embodiments of the invention are set out in the following paragraphs.

The apparatus may comprise charging means for charging said processing container with said waste material; wherein: said charging means has a charging/discharge inlet and is movable between a first position for charging waste material through said inlet and a second position for discharging material through said inlet; and said charging means is positioned above said processing container such that in said second position said charging means discharges material into said processing container under gravity when said processing container is rotated into its charging position.

Said charging means may be a charging bin rotatably mounted in a housing above said processing container, the arrangement being such that when said charging means is rotated into a discharge position and said processing container is rotated into a charging position said charging means inlet and said processing container are vertically aligned.

Said charging means and said door means may have cooperating opening means engageable to open said door means when said charging means rotates into said charging position.

Said cooperating opening means may comprise cam means on said charging means and cooperating roller means on said door means.

Said oven may further comprise a discharge opening below said processing container for discharge of material from said chamber.

Said oven and said door means may have cooperating opening means engageable to open said door means for discharge of said processing container.

The apparatus may further comprise a receptacle for receiving material discharged through said discharge opening and conveyor means for conveying said discharged material away from said oven.

Said conveyor means may comprise a screw conveyor.

Said oven may have drive support means for rotating said processing container in said oven.

Said processing container may have annular means supporting said processing container on said drive support means, said drive support means having a drive system engageable with said annular means for rotatably driving said processing container.

Said annular means may be formed by at least one ring-like member secured relative to said outer housing.

Load sensing means may be provided for monitoring the weight of said processing container in said oven thereby to monitor the weight of waste material in said processing container.

Said processing container means may be movable between a first location external to said oven and a second location in said oven.

Said processing container may be supported on platform means and in said second location said platform means serves as a closure of said oven.

Said processing container may have frame means for supporting said processing container on said platform means.

BRIEF DESCRIPTION OF THE DRAWINGS

The present invention is further described hereinafter, by way of example, with reference to the accompanying drawings, in which.

FIG. 5 is a side elevation of the processing container of the apparatus;

FIG. 6 is a cross section on the line A-A of FIG. 5 with parts omitted for clarity;

FIG. 7 is an enlarged view of a portion of the container of FIG. 6;

DETAILED DESCRIPTION OF THE DRAWINGS

Figure 1:
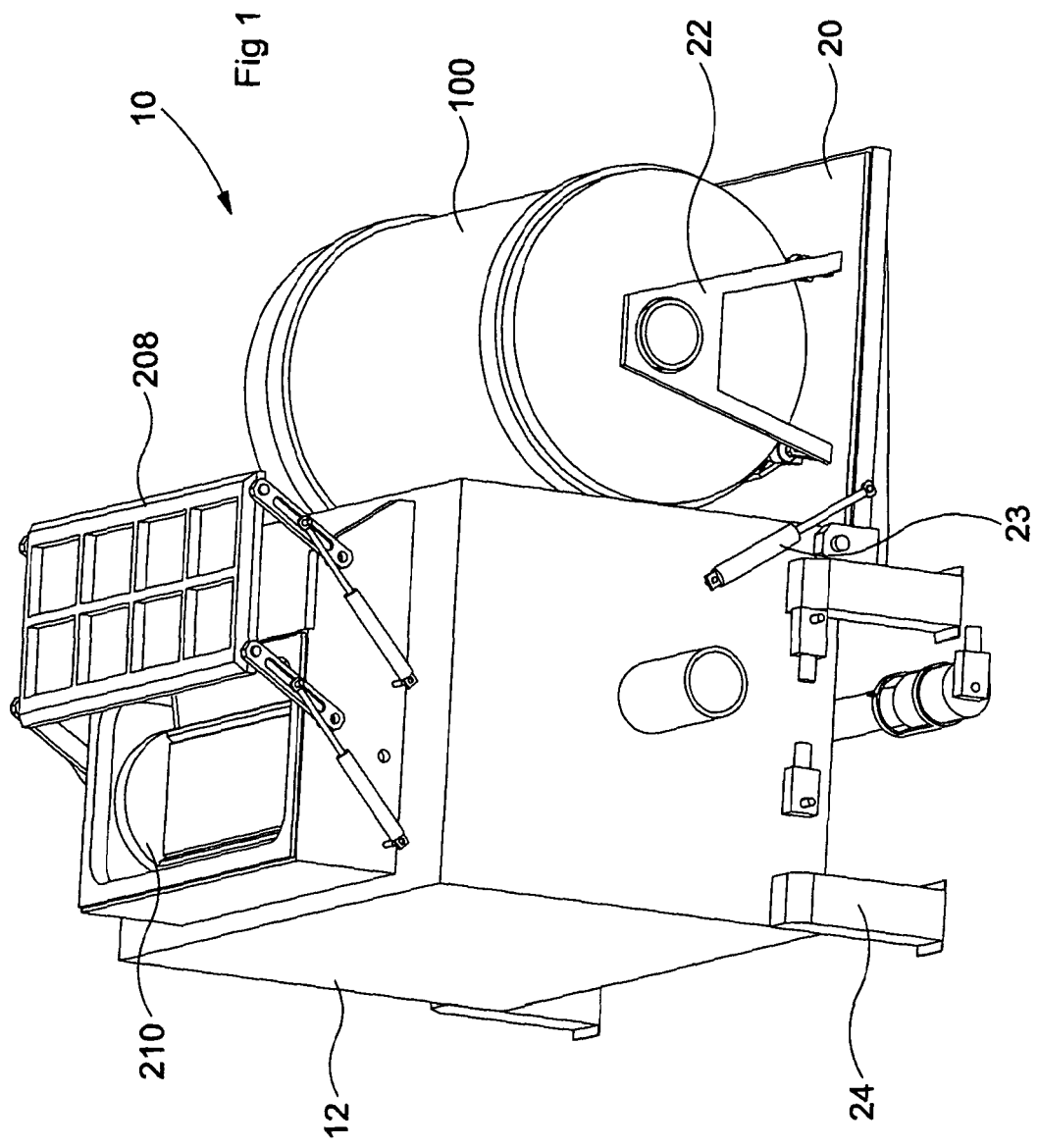
FIG. 1 is a perspective view of an embodiment of the waste processing apparatus according one preferred form of the present invention in an open attitude.

Referring to the drawings, these show an apparatus 10 for processing waste material 11 including organic waste and municipal solid waste (MSW). The apparatus is suited to thermally removing coatings and/or impurities from materials which are particularly suited to batch processing. The apparatus 10 has an oven 12 having a processing chamber 14 containing a waste processing container or drum 100 supported on platform means 20 by suitable frame supports 22, one at each end of the processing container.

Although only one processing container and associated supports are shown, it will be appreciated that more than one could be used in the apparatus according to the present invention. The oven 12 may be sized to contain one or more than one processing container either axially aligned or side by side.

The oven 12 is conveniently elevated above the floor on stilts or legs 24. The platform means 20 for the container 100 is conveniently in the form of a side wall or door to the oven 12 which is movable between a closed position in which the container is located in the oven 14 and an open position to enable easy access to the container 100 and processing chamber 14. The frame supports 22 support the container for rotation on the door 20. Movement of the door 20 is by any suitable means such as hydraulic rams 23 which pivot the door 20 into position.

In the drawings, the door 20 may be dimensioned and configured to serve as a closure to close the chamber 14 with the container 100 inside the oven and supported on the platform 20.

The illustrated processing container 100 has an outer housing 150 and a processing zone 152 within the housing in which the material is processed. The housing 150 has a ramp portion 154 which extends out of the plane of the housing, and is directed inwardly of the container to form an opening 160 for the charging and discharge of material into and out of the processing container. The portion 154 can be straight or curved but conveniently extends in a generally spiral shape inwardly of the container. The ramp portion 154 also extends in a circumferential direction of the container beyond the opening 160 such that the leading edge portion 182 of the portion 154 radially overlies or overlaps the free edge portion 158 of the opening 160.

The housing 150 is ideally of circular cross section, preferably cylindrical, although any suitable polygonal shape may be used, and has a number of skins. Here the housing is illustrated as being double skinned with an inner housing wall 102 and an outer housing wall 104 secured relative to the inner wall 102. The walls are preferably concentric or coaxial and the outer wall 104 preferably surrounds the inner wall 102 both circumferentially and at the axial ends of the container.

The inner and outer walls 102, 104 are spaced by partitions 162 which preferably extend the length of the housing to define channels 164 within the housing. The inner housing wall 102 is pervious to gases, and preferably has throughholes to allow gas from the channels to enter the processing zone 152.

The oven 12 has a gas inlet 200 for introducing hot gases into the container 100 and a gas outlet 202 for extracting gas from the container 100. The inlet and outlet are preferably located so as to be generally coaxial with the container 100 when the latter is loaded into the chamber 14. The gas inlet and outlet may alternatively or additionally be provided in the platform means 20, for example in the form of openings for connection to piping or conduits for the supply of gas into and extraction of gas from the processing container 100.

The container 100 also has outer end walls 110, 112, which close the axial ends of the outer housing wall 104. The inner housing wall 102 is formed with a generally frusto-conical portion 114, 116 at each axial end with respective end walls 110, 120 formed at each axial end of the inner chamber to close the inner chamber. The end wall, 120 is axially spaced from the end wall 112, with the channels 164 communicating with the spaces between the walls 112, 120.

The outer housing wall 104 has two annular support members, here in the form of rings 106 which are axially spaced apart along the housing wall. The rings may sit directly on the outer wall 104 or be raised above it on suitable supports. The oven 12 has a drive system which conveniently includes two drive rollers 40, 42 mounted on the floor 166 of the oven 12. Each roller 40, 42 extends substantially the length of the processing container housing 150 and contacts the rings 106 when the processing container is in the oven 12. The drive rollers are actuable to rotate the container 100 about its longitudinal axis. It will be appreciated that each roller may be replaced by two or more rollers, each one contacting a respective ring 106, or a gear mechanism engaging teeth on the rings 106. The drive rollers 40, 42 are arranged parallel with one another and support the container 100 for rotation about the longitudinal axis of the container 100. Each roller 40, 42 is coupled by a drive mechanism to a respective drive motor which can be actuated to rotate the rollers 40, 42, and in turn rotate the container 100 about its axis. The drive mechanisms may be belt, chain or geared mechanisms.

The rollers 40, 42 are rotationally supported on mounts which are coupled to a measuring means such as load cells (not shown), which serve to monitor the weight of the container 100. The signals from the load cells are fed to a control system and since the weight of the container itself is known, the control system provides an indication of the weight of the material in the container 100.

The double-skinned arrangement of the container 100 with its inner and outer housing walls 102, 104 has the advantage that when material is loaded into the container prior to the container being placed in the processing chamber 14, much of the liquid in the material will drain into the channels 164 between the two housing walls. It can then easily be drained away prior to loading the container into the oven. Drainage may be assisted by rotating the container 100 to tumble the material. The channels 164 thus act as a discharge space for the liquid.

A central conduit or pipe 122 extends from the outer end wall 110 to the inner end wall 120, being open at the former and closed at the latter. The outer end wall 112 opposite the pipe entry through the end wall 110 has a coaxial opening 130, which allows the entry of hot gases into the space 168 between the walls 112, 120 and into the channels 164. Whilst the pipe 122 and opening 130 are described as coaxial, they can of course be located at any suitable position within the container 100. They are ideally coaxial with the inlet 200 and outlet 202 when the container 100 is loaded into the chamber 14 but can be located in any suitable orientation or position relative to one another.

The inner chamber walls 102, 114, 116 are pervious to liquid to allow water and other liquids in the waste material to drain into the discharge space 164. These walls are conveniently perforated with holes or openings, which are of a size generally to retain the particulate waste material but allow the liquid to drain away. The holes may be arranged in any suitable manner such as a uniform manner but as will be appreciated they can be arranged in any suitable form or array. The openings may be arranged over a part of the circumference or the whole of the circumference of one or more of the walls 102, 114, 116 or over both a part of the circumference and the whole of the circumference at differing axial positions of the walls.

The pipe 122 is also provided with perforations or holes in its wall to allow the hot gases to pass between the processing zone 152 of the container 100 and the conduit 122. However, whilst these holes may be arranged around the whole of the circumference of the pipe 122 they conveniently only cover a portion of the circumference, typically 180 degrees, to force the hot gases to follow a less direct route through the processing zone. The openings may also be provided over both a part of the circumference and the whole of the circumference at differing axial positions of the pipe 122.

Figure 4:
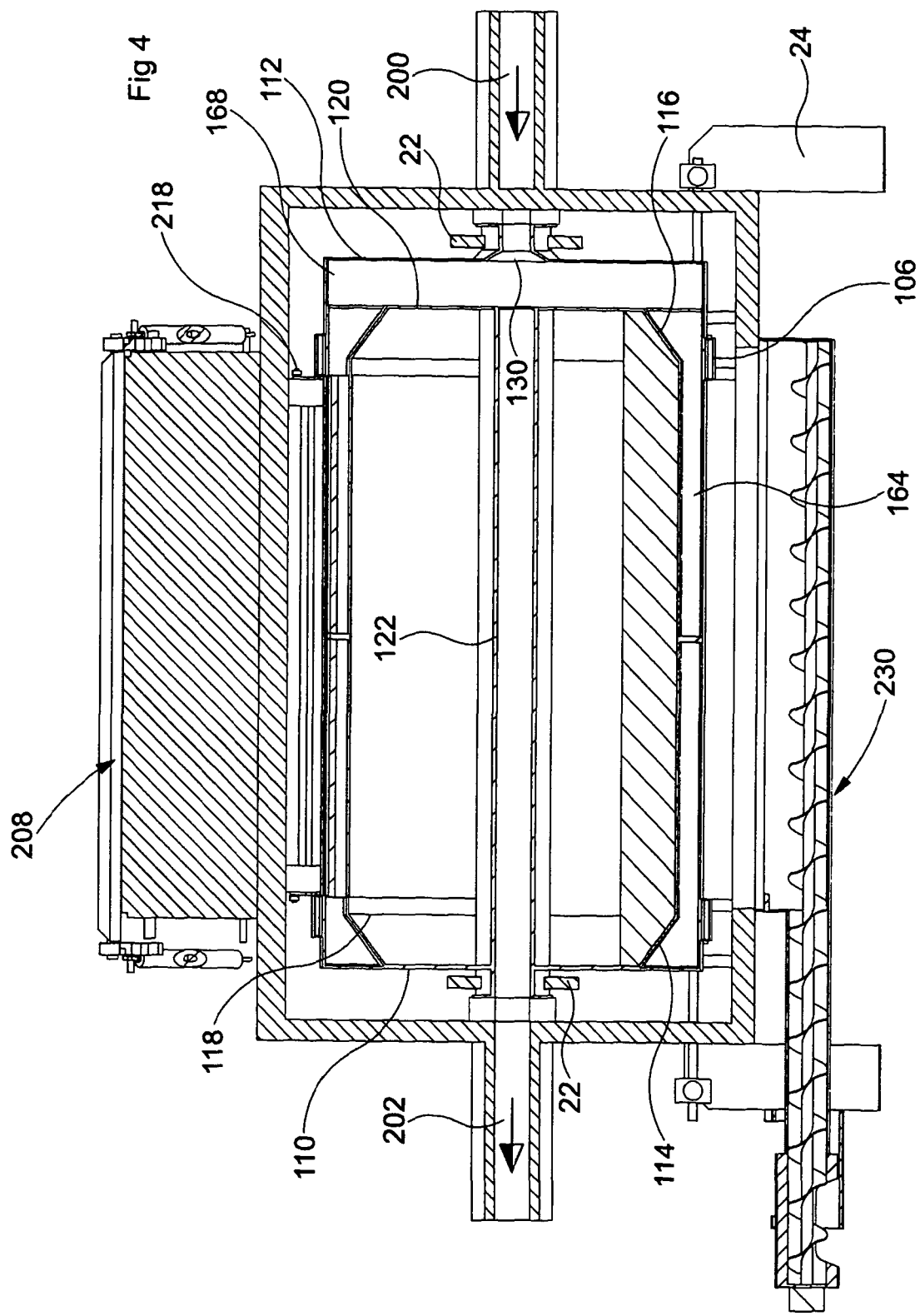
FIG. 4 is a longitudinal cross section through the apparatus and processing container of FIG. 2.

As can be seen from FIG. 4, when the container 100 is located in position in the oven 12 the inlet 130 of the container lies adjacent the gas inlet 200 of the processing chamber 14 with the conduit 122 generally axially aligned with the inlet 200 and outlet 202. Gases from the inlet 200 flow through the inlet 130 into the space 168, passing into the channels 164 and through the holes in the inner wall 102 into the processing zone 152. During processing, the container 100 is rotated about its axis on the drive rollers 40, 42 to cause the waste material to tumble and expose a greater surface area to the hot gases, which pass into the processing zone 152, then into the pipe 122 and out through the gas outlet 202. The container 100 may be rotated at fixed or variable speeds, and may be rotated in one direction for a period then rotated in the reverse direction for a period, or may be rotated back and forth through an angle of less than 360° conveniently at variable rotational speeds.

It will be appreciated that several containers 100 may be processed at the same time, axially aligned or side by side within a larger processing container 14.

Since hot gases have a tendency to rise, in order to assist movement of the hot gases entering the inlet 130 downwardly into the channels 164 and up through the waste material in the lower portion of the processing zone, a generally circular plate is mounted for free rotational movement in the space between the inner and outer end walls 120, 112. The plate has a V-shaped notch extending typically over about 45 degrees and is weighted such that the notch will hang under gravity at the bottom of the discharge space whilst the container 100 rotates. This tends to direct gases down and into the lower portion of the discharge space. Alternatively, hinged baffles or flaps may be placed on the interior of the outer end wall 112. These baffles or are hinged to the wall such that they can pivot between a position where the baffles extend substantially parallel with the longitudinal axis of the container and a position where they lie extending radially outwardly, adjacent or against the wall 112. In this way, as the container rotates, when the baffles lie above the rotational axis of the container 100 they will pivot outwardly away from the wall 112 to form a partial barrier for gases attempting to flow upwardly. When the baffles lie below the rotational axis they will hang generally vertically adjacent or against the wall 112 to allow general free-flow of gases downwardly.

Figure 3:
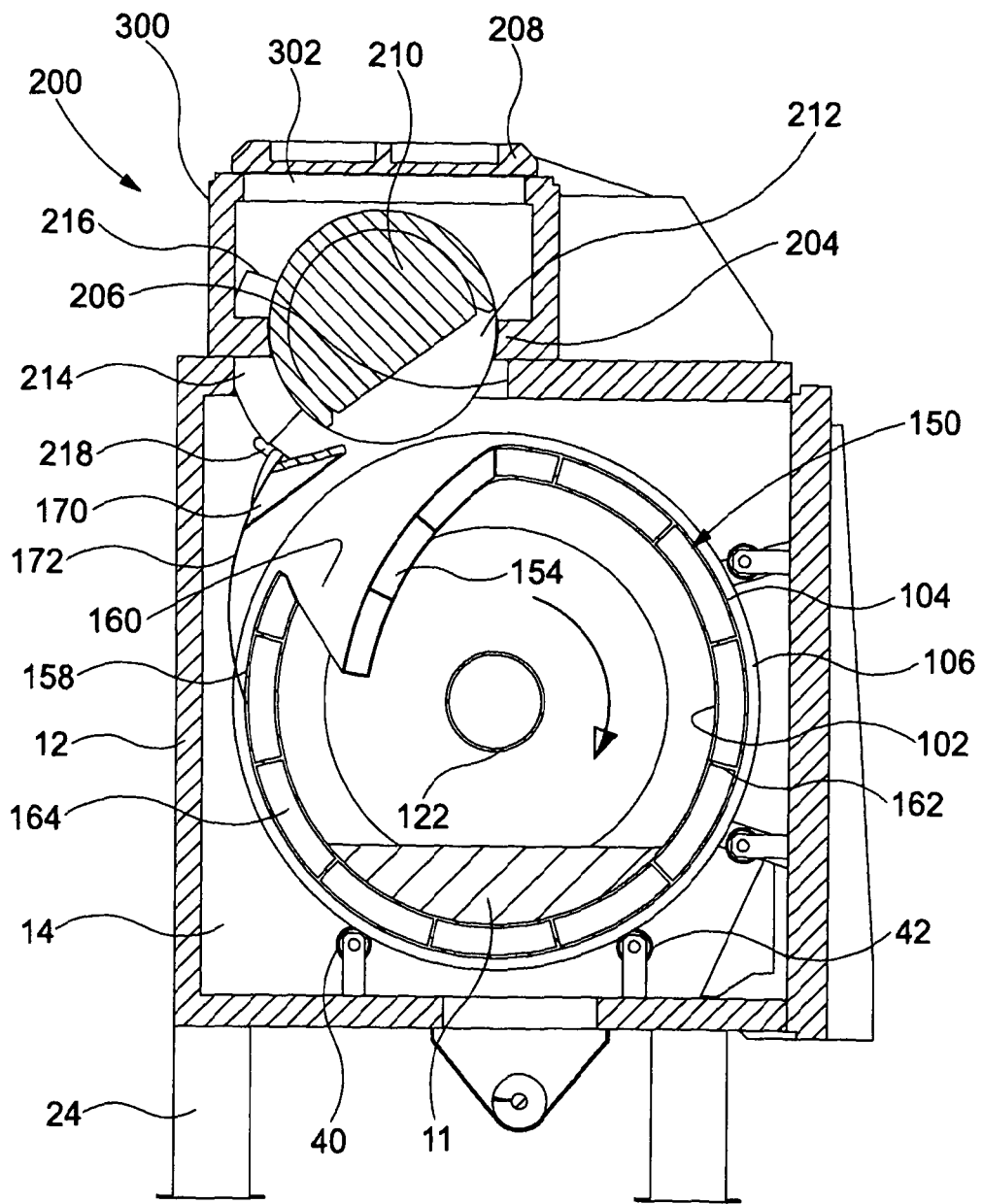
FIG. 3 is a view similar to that of FIG. 2 showing the processing container in a charging attitude.

The opening 160 is closed by a closure or door 170 movable between a first position closing the opening and a second position allowing charging and discharging of the processing container 100. The door 170 is of simple lightweight construction which can be used to baffle the opening without providing a tight seal, and is biased into its closed position. In a preferred form the door is mounted to the outer wall 104 by suitable means such as steel strips 172 which flex to allow opening of the door and resile to the closed position. As explained above, the portion 154 extends in a circumferential direction of the container beyond the opening 160 such that the leading edge portion 182 of the portion 154 radially overlies the free edge portion 158 of the opening 160. This has the advantage that when the container 100 is rotated in a clockwise direction as seen in FIG. 3 the material tumbles around the container and falls under gravity over the edge 182 without contacting the door. The door thus does not have to provide a material-tight seal and can be a relatively loose fit.

As is best seen in FIGS. 6 and 7 the ramp portion 154 is provided with a speed brake ramp 180 at its free edge or lip 182. The brake ramp 180 has an edge 184 over which the material 11 tumbles as the container rotates in a clockwise direction during processing. The edge 184 forms an obstruction for the material being processed as it tumbles along the container wall. As the container rotates clockwise and the material 11 tumbles onto the ramp portion 154, it accelerates along the ramp portion 154 and gathers momentum. The brake ramp 180 interrupts (diffuses) the momentum of the material, thus slowing it down prior to its falling over the edge 184 of the brake ramp 180. The interruption of a continuous rotational cycle of the material 11 within the cylindrical processing container 100 has the effect that "baling" (clumping together of material to form large clumps) is reduced.

The free edge 182 of the ramp portion 154 is also provided with one or more openings or nozzles 186 through which the hot gases from the adjacent channel 164 can exit. By slowing down the speed of the material as it passes over the edge 184 it is subjected to the hot gases from the nozzles 186 for a longer period. The nozzles are positioned and orientated to direct the gases laterally through the falling material. Generally, the nozzles direct the gases generally perpendicular to the material fall direction. The hot gas passes through the nozzles 186 at high velocity forming a piercing jet to interact more efficiently with the material 11. The hot gas propagates deep into the material as it falls, again increasing efficiency and reducing process time, thus translating into a higher production capability. The material being processed is dispersed and tumbled as it falls off the edge and onto the chamber inner wall 102, allowing more effective interaction with the hot gas and reducing the process time cycle. This creates separation and aeration of the material which allows the hot gas to penetrate and interact more effectively with the material being processed. A "waterfall" effect is created with the hot gas piercing through the material as it falls past the nozzles 186.

Charging of the processing container 100 is effected by a charging mechanism 200 which has a housing 300 mounted above the oven 12. The housing 300 has an aperture 204 facing an aperture 206 in the oven upper wall through which material is passed during charging of the processing container 100.

Figure 2:
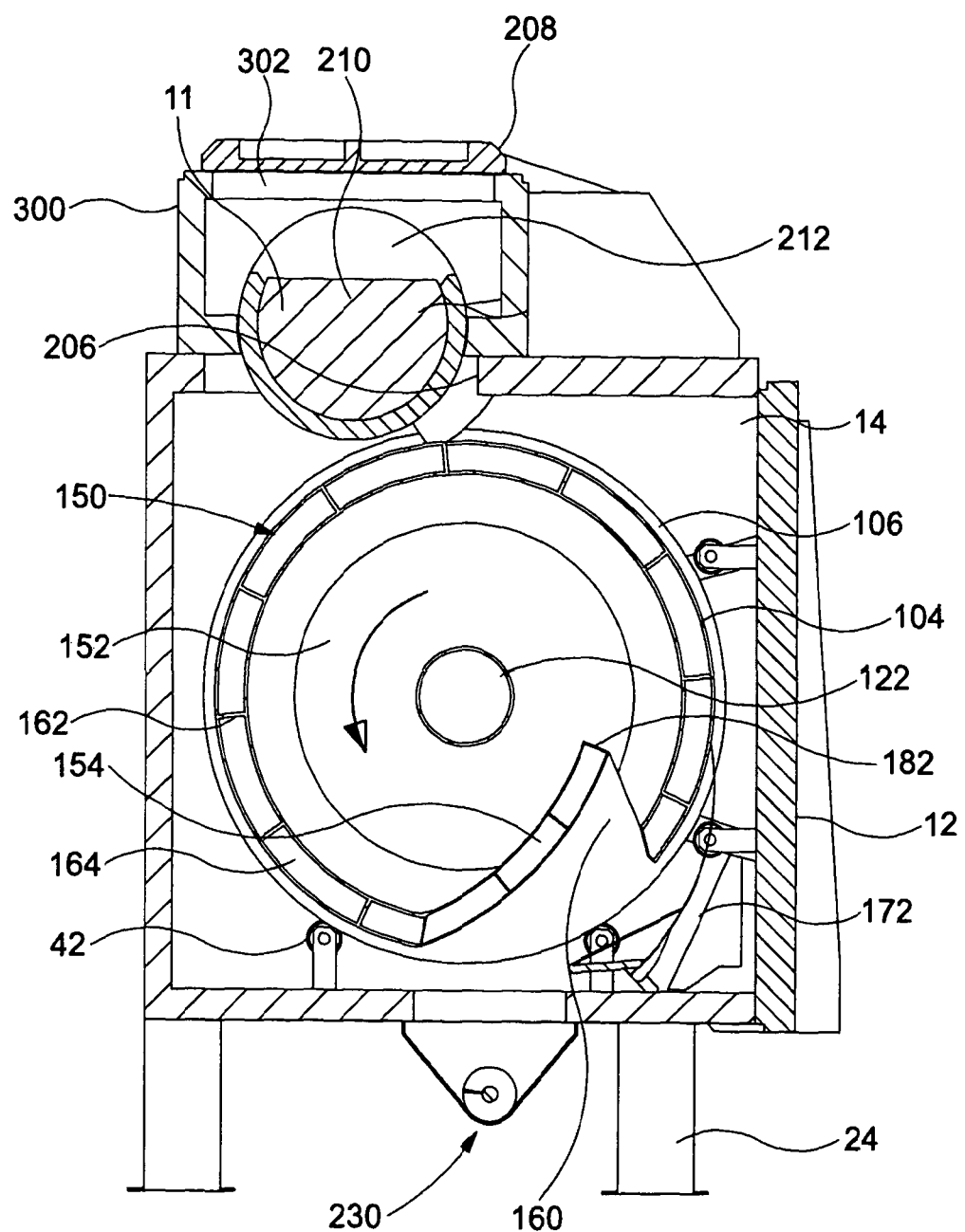
FIG. 2 is a cross section through the apparatus of FIG. 1 in a closed attitude showing a processing container according to a preferred form of the present invention in a discharging attitude.

The housing 300 has an upper opening 302 closed by a closure or door 208 which can conveniently be slid or lowered into position by hydraulic rams. The housing 300 also contains a charging hopper 210 which is movable between a first position in which it can be charged through the opening 302 and a second position in which it discharges material, under the action of gravity, into the processing chamber 14 of the oven 12 and then into the container 100. The hopper 210 is conveniently part cylindrical in form, having an opening or mouth 212 through which material passes into and out of the hopper. The hopper is also rotatably mounted in the housing 300 such that it can be rotated into a position where the opening 212 is immediately below the opening 302 of the hopper housing 300 to allow loading of material into the hoper 210 (FIG. 2). The hopper can then be rotated into the position shown in FIG. 3 where the opening 212 faces the interior of the processing chamber 14 to allow discharge of the material from the hopper 210. Prior to rotation of the hopper 210 into the position shown in FIG. 3, the container 100 is rotated into the position shown in FIG. 3 where the portion 154 lies immediately below the hopper 210. The effect of this is that the portion 154 forms a chute for the material falling from the hopper 210, directing it through the opening 160 into the processing zone 152. Ideally, the outer wall 104 which extends along the portion 154 is curved inwardly of the processing zone.

In order for the material from the hopper 210 to pass through the opening 160 the door 170 must first be opened and this is conveniently effected by a cam means 214 in the form of a cam surface on the outer surface of the hopper 210. The cam is conveniently arcuate shaped extending over an angle of typically 65°. With the processing container 100 stationary in the position shown in FIG. 3, the hopper 210 is rotated in a clockwise direction as seen in FIG. 3. As rotation continues the leading edge 216 of the cam 214 contacts a co-operating means 218 on the door 170 and raises the door 170 away from the opening 160 against the bias of the steel members 172. Material in the hopper 210 thus falls on to the chute and passes through the opening 160 into the processing zone 152. As the hopper 210 continues to rotate, the co-operating means 218 are released and the door 170 is closed by the action of the steel members 172. The processing container 100 is then rotated in a clockwise direction as seen in FIG. 3 and the hot processing gases can be fed into the processing zone through the channels 164, passing out through the piping 122, to process the material in the processing container 100. The hopper 210 can then be further rotated to bring the opening 212 into alignment with the opening 302 to enable further charging of the hopper.

As can be seen from FIG. 3 the hopper 210 partially encroaches into the processing chamber 14.

The co-operating means 218 on the door 170 are conveniently one or more rollers contacted by the cam 214. It will be appreciated that one or more cams 214 may be provided for contacting one or more rollers 218. Ideally, a respective co-operating means 218 is provided at each end of the door 170 for contacting by a respective cam 214. The relationship of the geometry is such that the cam 214 has sprung the door 170 open by the time the material to be processed begins to enter into the process container 100. It will be appreciated, of course that, by suitable timing, the processing container 100 need not be stationary during charging but can be rotated clockwise as the hopper 210 rotates clockwise.

To discharge the processing container 100 after the material has been processed, rotation of the container is reversed i.e. the container is rotated anticlockwise as seen in FIG. 2. This has the effect of moving the processed material to the opening 160 through which it passes into a suitable conveyor means 230 (in the preferred embodiment this is a screw conveyor) where it is conveyed away from the oven.

Opening of the door 170 can be effected either by the gravitational weight of the material or by suitable cam means or a catchment device which engages the rollers 218 to open the door.

Figure 8:
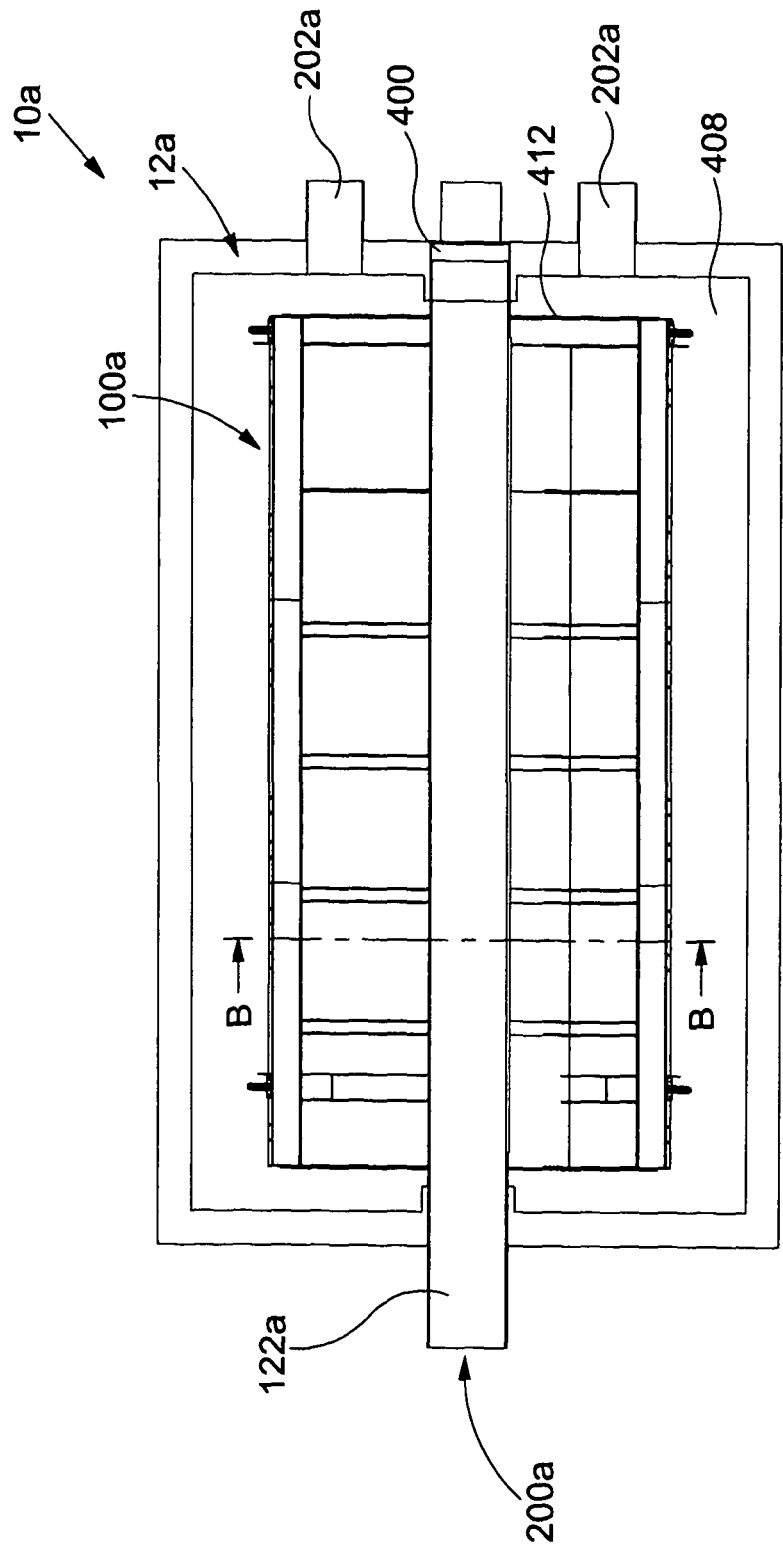
FIG. 8 is a longitudinal cross section of an alternative embodiment of the waste processing apparatus according another preferred form of the present invention.
Figure 9:
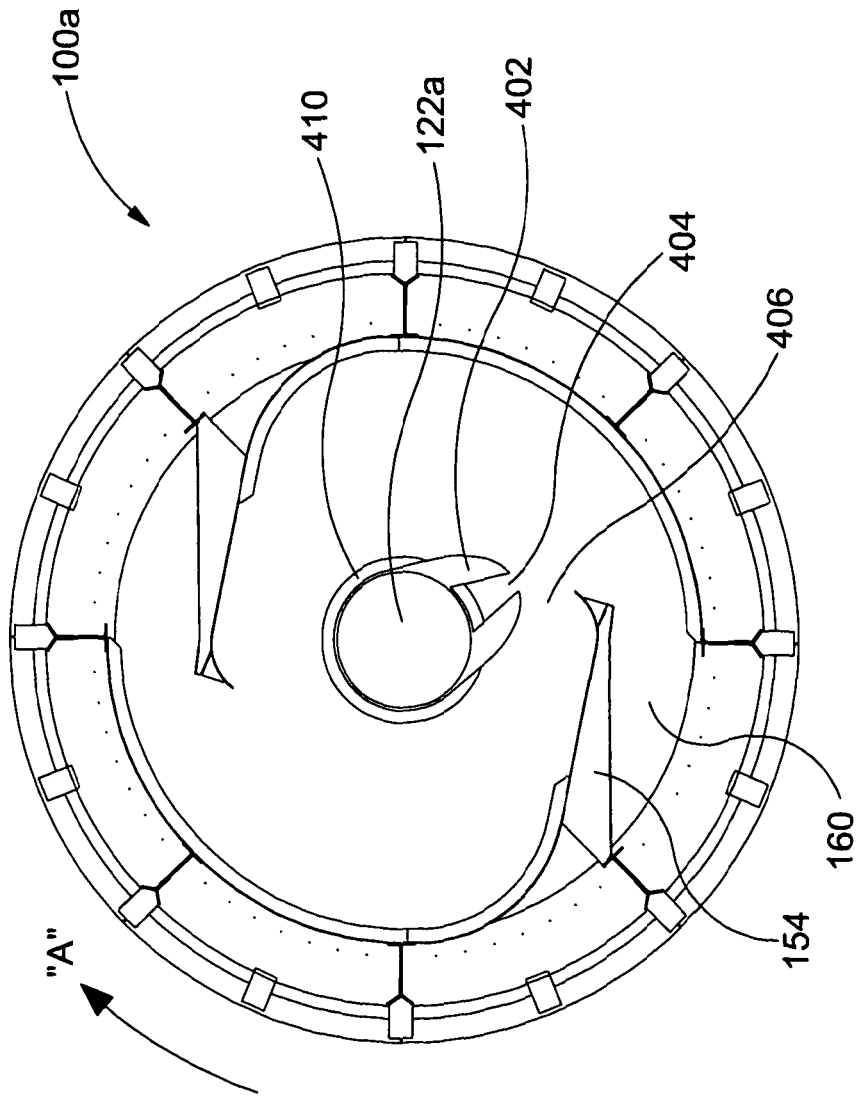
FIG. 9 is a cross section through of the processing container of FIG. 8 on the line B-B.
Figure 10:
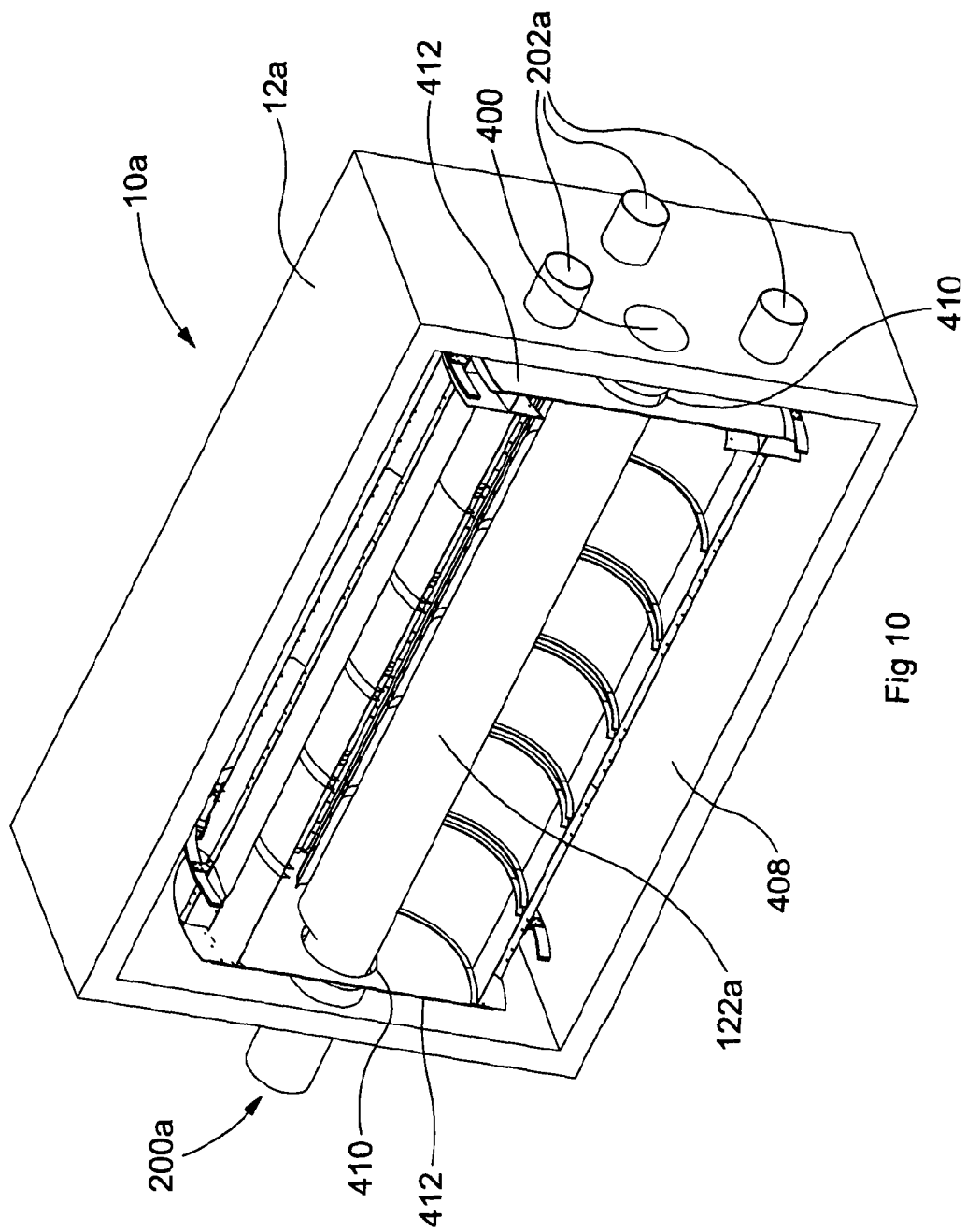
FIG. 10 is a perspective section view of the embodiment of the invention shown in FIGS. 8 and 9.

Referring to FIGS. 8, 9 and 10 an alternative embodiment of the invention is shown. In this embodiment an apparatus 10a is shown comprising an oven 12a having an inlet 200a and outlets 202a. The inlet 200a comprises a pipe 122a that extends through the oven 100a and extends the length of the processing container 100a and terminates in the opposite wall of the oven 12a at a sealed end 400.

The processing container 100a comprises a drum, preferably made of a sheet metal, which rotates substantially about the pipe 122a. The drum sits on a plurality of rollers as described above in relation to FIGS. 2 and 3 which are omitted for clarity from FIGS. 8 and 10.

Inwardly directed portions 154 form the opening 160 through which the processing container 100a is loaded and unloaded in the same manner as described above.

The pipe 122a has a nozzle 402 with a nozzle opening that extends along the length of the pipe 122a within the processing container 100a.

In use waste to be processed is loaded into the processing container 100a and the container rotates in a clockwise direction as depicted by arrow A in FIG. 9. Hot air is directed in the inlet 200a and passed along the pipe 122a and exits via the nozzle 402. As the processing container 100a rotates waste material will pass through the gap 406 between the nozzle 402 and the inwardly directed portion 154. As the material passes the end of the nozzle it is heated by the flow of hot gas passing out of the nozzle 402. The nozzle is directed to dispense the hot gas into the waste as it tumbles from the end of the inwardly directed portion 154 and thus good heating of the waste and quick evaporation of any liquid therein can be achieved. As a single elongate nozzle is provided (although the skilled person will appreciate that a plurality of shorter elongate nozzles or an array of individual nozzles would perform the same functional requirement) the gas has full contact with the material being processed and thus effective heat transfer is enabled.

The pipe 122, or alternatively just the nozzle 402 can be rotated to alter the direction in which the gas exits the nozzle. This rotation will just alter the angle of the nozzle and it will be appreciated that during operation the pipe is substantially stationary with respect to the oven 12a. Rotation of the pipe 122a to change the inlet angle of the hot gas may be needed depending on factors such as the liquid content, thermal capacity and density of the waste being treated. The pipe 122a may be rotated by any suitable means within the scope of the skilled person. For example the pipe 122*a* could be rotated by the provision of a mechanical or electrical drive attached to the sealed end 400.

Once the gas has heated the waste it, together with any process gas, exits the processing container 100*a* via the openings 160 and enters the void 408 between the processing container 100*a* and the oven 12*a*. In addition a small amount of the gas exits the processing container 100*a* via a small clearance gap 410 between the pipe 122*a* and the end face 412 of the processing container. The gas flow path of this embodiment eliminates the need for the double shelled processing container of the previous embodiment. Furthermore in this embodiment there is no need for rotational seals between the pipe 122*a* and the processing container 100*a* as a gas flow outlet gap is provided in its place. As rotational seals in high temperature dirty environments are prone to failure this embodiment presents a lower maintenance apparatus than the first embodiment.

The outlets 202*a* are a stationary part of the oven 12*a* and communicate fluifically with the void 408 so that they form an outlet for the gas from the oven 12*a*.

In use, rotation of the oven in the anticlockwise direction, i.e. in the opposite direction to that depicted by arrow A in FIG. 9, causes the contents of the processing container 100*a* to pass through the opening 160 to be emptied from therefrom. More details of this operation is given above in relation to the first embodiment.

One further way in which this second embodiment differs from the first is that the door 170 of the first embodiment is eliminated in the second embodiment. As the openings 160 form gas outlets in the second embodiment it is not necessary to seal the openings when the container is not being filled or emptied. The second embodiment is simpler in this regard.

It will also be appreciated that the gas flow path of the second embodiment eliminates the need of the baffles of the first embodiment. This enables the rotational speed to ne independent of the gas flow as there is no limitation imposed by the shear of the gas imposed by the baffles of the first embodiment.

Figure 11:
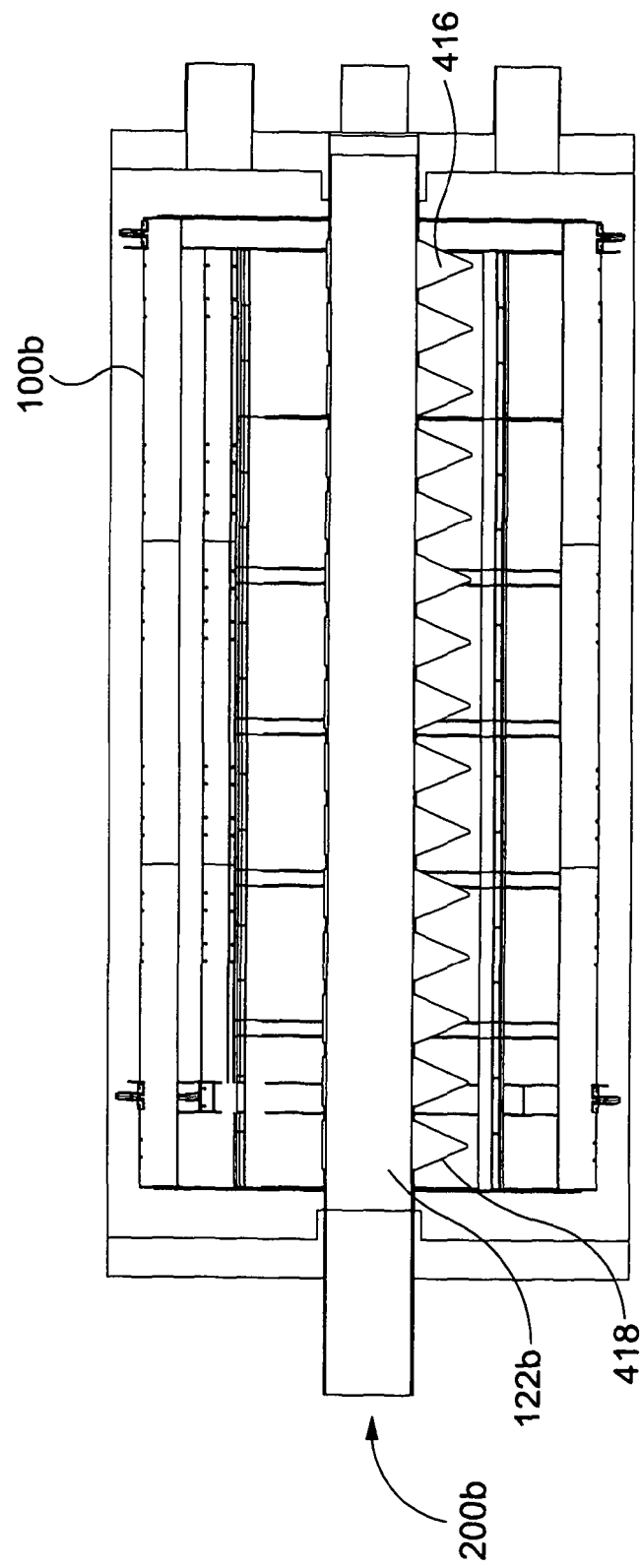
FIG. 11 is a longitudinal cross section of another alternative embodiment of the waste processing apparatus according another preferred form of the present invention.
Figure 12:
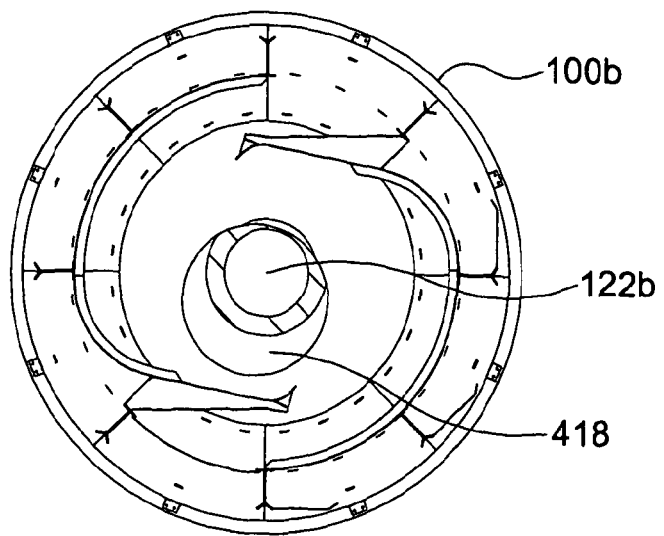
FIG. 12 is an cross section of through of the processing container of FIG. 11.
Figure 13:
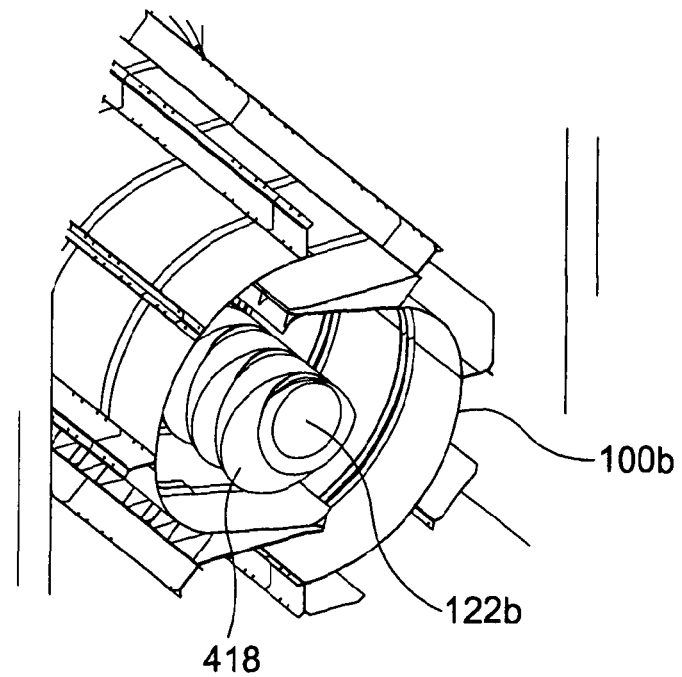
FIG. 13 is a perspective section view of the embodiment of the invention shown in FIGS. 11 and 12.

Referring to FIGS. 11 to 13 a further embodiment of the invention is shown. This embodiment is substantially the same as that shown in FIGS. 8 to 10 except in so far that the pipe 122*a* and nozzle 402 arrangement is different.

In the embodiment shown in FIGS. 11 to 13 a central pipe 122*b* that forms the gas inlet 200*b* is provided with a plurality of inlet means 414 mounted on said pipe 122*b* through which the hot gas enters the processing chamber 100*b*.

The inlet means 414 are preferably cylindrical wedge shapes, the tapered portion 416 of each wedge extending from the pipe 414 in a substantially downwards direction and rotationally offset into the direction of rotation of the processing chamber 100*b*. The faces 418 of each inlet means 414 is provided with a plurality of holes (omitted for clarity) through which gas passing into the pipe 122*b* via said inlet 200*b* can exit into the processing chamber.

In this embodiment material being processed separates into a plurality of material streams passing partially or substantially between the faces 418 of the inlet means 414. As the hot gasses enter the processing chamber through the holes in the faces 414 they immediately come into contact with a large surface area of material being processed. This assists in maximising the heat transfer to the material from the hot gas and can assist in reducing the overall times for processing a batch of material.

As will be recognised by the skilled person apart from where indicated above the operation of the first, second and third embodiments is substantially similar and many features described in relation to the first embodiment are used in combination with the different processing chamber of the second embodiment.

The invention claimed is:

1. An apparatus comprising:
    an oven having a processing chamber;
    a gas inlet for introducing hot gases into the oven;
    a gas outlet for extracting gas from said oven;
    a processing container mounted for rotation in said processing chamber for processing waste material, the processing container having:
        a housing of substantially circular or polygonal cross-section;
        a processing zone in said housing for containing waste material to be processed; wherein:
            said processing container is rotatable about its longitudinal axis in a first direction for processing of said material in said container and in a second, opposite direction to enable discharging of said container through an opening;
            said housing has a portion directed inwardly of said container to form said opening for the charging and discharging of said processing container, said inwardly directed portion extending in a circumferential direction of said container beyond said opening; and
            the processing container has a door movable between a first position closing said opening and a second position allowing charging and discharging of said processing container;
    said apparatus further comprising a charging mechanism for charging said processing container with said waste material;
    wherein said charging mechanism comprises a charging hopper having an opening for the charging and discharging of material, the charging hopper being movable between a first position for charging waste material through said opening and a second position for discharging material through said opening; and
    said charging hopper is positioned above said processing container such that in said second position said charging hopper discharges material into said processing container under gravity when said processing container is rotated into its charging position; and wherein
    said charging hopper and said door having cooperating opening members engageable to open said door when said charging hopper rotates into said charging position.

2. The apparatus as claimed in claim 1 wherein said processing container door is biased into said closed position.

3. The apparatus as claimed in claim 1 wherein said housing has inner and outer walls defining a space therebetween for receiving said hot gases and said inner wall has openings therein for passage of said hot gases into said processing zone.

4. The apparatus as claimed in claim 1 wherein said inwardly directed portion has a brake ramp extending out of the plane of said inwardly directed portion thereby to slow momentum of said material as it passes over the brake ramp.

5. The apparatus as claimed in claim 4 further comprising openings for directing hot gases through said material as it falls from said brake ramp.

6. The apparatus as claimed in claim 1 having a pipe extending into said processing zone for conducting gas into said zone, said pipe having at least one outlet within said zone for passage of said gas from said pipe into said processing zone.

7. The apparatus as claimed in claim 6 wherein the pipe has an elongate nozzle having a nozzle opening in the shape of a slit that extends along the length of the pipe within the processing container.

8. The apparatus according to claim 6 wherein the at least one outlet comprises a plurality of substantially wedge or cylindrical wedge shaped outlets, and wherein the plurality of substantially wedge or cylindrical wedge shaped outlets each have side faces that have a plurality of holes therein through which the hot gas passes.

9. The apparatus according to claim 7 wherein the inwardly directed portion is rotatable relative to the nozzle, and wherein the inwardly directed portion and the nozzle are sized and configured to form a gap between the nozzle and the inwardly directed portion as the inwardly directed portion rotates past the nozzle.

10. The apparatus according to claim 7 wherein the pipe or the nozzle can be rotated.

11. The apparatus according to claim 7 wherein the nozzle is positioned to substantially direct hot gas at the region in which contents of the housing would tumble, under the influence of gravity, from the inwardly directed portion as the housing is rotated.

12. The apparatus as claimed in claim 1 wherein said charging hopper is rotatably mounted in a housing above said processing container, the arrangement being such that when said charging hopper is rotated into a discharge position and said processing container is rotated into a charging position said charging hopper, opening and said processing container are vertically aligned.

13. The apparatus as claimed in claim 1 wherein the processing container has a door movable between a first position closing said opening and a second position allowing charging and discharging of said processing container, said oven further comprises a discharge opening below said processing container for discharge of material from said processing chamber, and said oven and said door have cooperating opening members engageable to open said door for discharge of said processing container.

14. The apparatus as claimed in claim 1 wherein said oven has drive members for rotating said processing container in said oven, and said processing container has annular support members supporting said processing container on said drive members, said drive members having a drive system engageable with said annular support members for rotatably driving said processing container.

15. The apparatus as claimed in claim 1 further comprising load sensors for monitoring the weight of said processing container in said oven thereby to monitor the weight of waste material in said processing container.

16. The processing container as claimed in claim 1 wherein said processing container is rotatable in a first direction for said charging and in a second, opposite direction for said discharging.

17. The apparatus according to claim 8, wherein the plurality of substantially wedge or cylindrical wedge shaped outlets can be rotated.

* * * * *